Patented Dec. 11, 1951

2,578,326

UNITED STATES PATENT OFFICE 2,578,326

PURIFICATION OF BENZENE POLYCARBOXYLIC ACIDS BY AN OIL SUBLIMATION PROCESS

William G. Toland, Jr., Richmond, Calif., assignor to California Research Corporation, San Francisco, Calif., a corporation of Delaware No Drawing. Application September 6, 1949,
Serial No. 114,268

6 Claims. (Cl. 260—525)

This invention relates to a process of separating organic materials. More particularly, the invention relates to a novel process of oil sublimation to separate practically pure aromatic carboxylic acids from mixtures in which the aromatic carboxylic acids are difficult to separate by conventional sublimation means.

Sublimation is commonly defined as the process in which a substance is made to pass from solid to gaseous state and again condense to solid form without apparently liquefying. Orthodox sublimation in which the solid passes directly into the vapor stage and from the vapor back again to the solid has been in use since the time of the alchemists. Steam sublimation or steam distillation which is not, strictly speaking, a true sublimation has also been commonly used. However, this type of sublimation usually is performed under conditions in which the material being sublimed is permitted to liquefy and then distill rather than sublime, thus making it subject to many disadvantages commonly encountered in ordinary distillations.

Despite the fact that sublimation has been known and used for a great number of years, relatively few real improvements have been made in the process as it was known to the early alchemists. One of the most important problems encountered in sublimation has been the fact that whenever there is a substantial amount of material to be sublimed, there is an accompanying poor heat transfer, thus causing the material nearest the heat to sublime or sometimes thermally decompose, while the remaining material is unaffected. The tendency of the portion of the material next to the heat source to sublime first also results in the residual impurities of the reaction mass forming an insulating layer next to the heat source in the space formerly occupied by the material sublimed. This insulating mass of impurities serves to further aggravate the poor heat transfer conditions already existing in the operation.

Another major problem encountered in previous processes of sublimation has been in the condensation of the sublimed vapors. The sublimed vapors solidify and form a coating upon the walls of the equipment and condensers with which they come into contact. Such coating out results in poor heat transfer and eventual plugging up of the equipment, thereby necessitating the use of some type of mechanical scraper. This means that the process of sublimation must be discontinued now and then to clear out the solidified sublimate. Furthermore, there is considerable danger of contamination from the walls of the equipment. This problem has been partially avoided in the art by the use of cooling gases which usually are recirculated for economical reasons. Prior to such recirculation, the gases must be cooled and any sublimed vapors present in them may solidify and coat out on the surfaces of the cooler, thereby raising the same, original problem as was involved in the condensation stage.

A further disadvantage of the processes of sublimation as practiced in the prior art has been that the high temperature of sublimation for various materials often results in thermal decomposition of the material.

An object of the invention is to provide a new and improved process for separating materials by sublimation.

Another object of the invention is to provide a new and improved process for separating materials by sublimation wherein good heat transfer conditions are maintained.

A further object of the invention is to provide an improved process for separating materials by sublimation in which the tendency of the sublimed materials to coat out on equipment surfaces is avoided.

Still another object of the invention is to provide a new and improved process for separating materials by sublimation in which means other than or in addition to high vacuum are utilized to reduce the temperature of sublimation.

Other objects and advantages of the invention will be apparent to those skilled in the art from the following disclosure.

It has been discovered that organic materials can be separated from mixtures containing impurities by an improved sublimation process wherein the impure mixture is suspended in its solid state in a heat-stable liquid medium. The liquid medium is substantially inert and immiscible relative to the solid organic mixture and capable of carrying it in suspension. The separation process is carried out at reduced pressures and temperatures of less than those at which thermal decomposition of the mixture being sublimed and the suspending medium may occur. The vaporized products from the sublimation are condensed and solidified in the form of a slurry of sublimate and distillate from the liquid medium, and the sublimed material, or sublimate, is then recovered by filtration, decanting, skimming or other separation means for solids and liquids known to the art. The liquid medium recovered may be re-used in the process.

This new and improved sublimation process of separating organic materials overcomes all the major disadvantages inherent in prior art sublimations. By means of the sublimation process of the invention excellent heat transfer may be maintained throughout the operation thereby greatly enhancing the overall efficiency. In addition to improved heat transfer and operating efficiency, the recovery of the sublimate may be much more readily effected in the present process than in the prior art since the "coating out" of sublimate which ordinarily occurs is avoided. By selecting a liquid medium of the type herein specified, sufficient liquid is distilled concurrently with the sublimation to provide an entraining agent for the sublimate capable of preventing it from adhering to equipment surfaces. This aspect of the new and improved process of recovering materials may be described as a "co-distillation sublimation."

Materials which formerly were incapable of purification by sublimation because their high temperatures of sublimation under normal conditions invariably resulted in thermal decomposition of the material may also be resolved by this process. The reduced pressure of the process combined with the partial pressure effect of the liquid medium lowers the temperature of sublimation for the material to a point well below that at which thermal decomposition is likely to occur.

A radically distinct type of sublimation from those heretofore disclosed in the art may be carried out by the new and improved process of the invention. This operation, which may be termed a "fractional co-distillation-sublimation," comprises subliming away fractions of the organic material along with distillate from the liquid medium until the desired fraction of organic material is left as residue in a pure state suspended in the liquid that remains. In sublimations formerly practiced fractional separations were impossible due to the fact that the vapors being sublimed solidified and were not capable of rectification as in the case of distilled liquid vapors refluxing in a fractionating tower. Although the present process of fractionation is performed entirely in the still, thereby incidentally eliminating the necessity of a fractionating column, it is truly a fractional separation suitable for isolation of any particular solid organic material from a solid sublimate mixture.

In general, it is found that a liquid possessing good heat transfer properties and a low vapor pressure which is at least greater than that of the materials sublimed is desirable for the sublimation process of the invention. The improved process is preferably conducted at a reduced pressure within the range of from about 1 to 760 millimeters which is equal to the combined partial pressures of the solid organic material and the suspending medium at the sublimation temperature. To avoid liquefaction and distillation of the material to be sublimed, I have found it important to maintain the sublimation temperature at a point below the melting point of the materials sublimed and less than the temperature of thermal decomposition for the solid material and the suspending medium.

The materials to which the new process of sublimation of the invention may be adapted may be any solid organic materials. Those materials which possess high melting points and are difficult to distill are easily handled. In particular, materials which are solid at temperatures of 650° F. and above, as well as those materials which are incapable of distillation at ordinary distillation temperatures because of their inability to exist in a liquid state may be processed without difficulty according to the invention. Similarly, materials that are unstable at normal sublimation temperatures are also readily dealt with. It is evident from the aforesaid that such materials which cannot be distilled or sublimed by ordinary procedures may be easily resolved according to the improved process of my invention.

Difficultly separable mixtures, and particularly those containing residual impurities such as color bodies, as well as those which contain isomers of the material to be recovered, are also capable of being separated by the process. Mixtures of aromatic carboxylic acids or mixtures containing them which heretofore have been impossible or difficult to resolve can be easily rectified. Examples of some of these acids are isophthalic acid, terephthalic acid, ortho phthalic acid, phthalic anhydride, pyromellitic anhydride, etc.

The medium in which the new and improved process of the invention is carried out, as mentioned above, is a liquid that is heat-stable as well as inert and immiscible toward the material to be sublimed and also capable of suspending it during the process of the sublimation. A particular group of such media are those in which the material to be sublimed is insoluble and which are capable of carrying the material in suspension at the concentration utilized. Preferably, the liquid medium is an organic liquid characterized by a molecular weight exceeding the molecular weight of the mixture being sublimed. More desirably, the liquid medium of the process also possesses good heat transfer ability and a low vapor pressure which is at the same time greater than the vapor pressure of the materials sublimed. Preferably, the vapor pressure of the medium should be at least twice as great as that of the solid material at the temperature of operation while an even more preferred group of organic liquid media is that having a vapor pressure of from about 4 to 100 times as great as the vapor pressure of the solid organic material sublimed at the temperature of sublimation. A still more preferred group is that possessing a vapor pressure of from about 5 to 20 times greater than that of the solid being sublimed at the temperature of sublimation. These inert heat-stable organic liquids may be either hydrocarbons or polar compounds, in particular, oxygen-containing compounds. Illustrative of such polar compounds are the various esters of aromatic acids—for example, the dimethyl phthalates. As representative of another of the oxygen-containing polar-type compounds which may be utilized according to the process, liquid media such as Dowtherm, which is a mixture of diphenyl ether and diphenyl may be used in the invention. Any materials of these general types which are not reactive with the material to be sublimed at the temperature of operation may be used as media for the process.

Although many liquid media possessing the above characteristics are satisfactory for the purposes of the invention, it has been found that especially tailored hydrocarbon oils are particularly useful. By especially tailored, we means oils that are especially selected and/or blended for use with any given charged material. Such hydrocarbon oils may be of either synthetic or natural origin as obtained from petroleum. With reference to the recovery of benzene polycarboxylic acids, a petroleum hydrocarbon oil blend having an average molecular weight in excess of the material to be sublimed and boiling within the range of from about 400° F. to about 750° F. has been found especially suitable. This type of oil just described can also be used to a particular advantage in the fractional sublimation of isomeric mixtures of benzene polycarboxylic acids. Although oils refined by ordinary refinery procedures are generally quite suitable, the highly acid refined oils such as white oils are singularly useful for the removal of residual impurities such as color bodies.

As already mentioned, the pressure at which the process of the present invention is carried out should be reduced to a point at which it is equal to the combined partial pressures of the solid material and the liquid medium at the temperature of operation. This pressure ranges from about 1 to 760 millimeters and preferably from about 20 to 200 millimeters. Although separation and purification may be obtained throughout these ranges, it should be stated that the lower pressures within these ranges are most desirable since the efficiency of the separations and fractionations by sublimation is increased as the pressure is decreased.

The temperature used in the process of the present invention, as previously mentioned, should be maintained below the melting point of the material sublimed. In the case of compounds which decompose before reaching their melting point, the temperature should be maintained below that temperature at which decomposition of the material sublimed and the suspending medium occurs. Preferably, the temperature will be below about 650° F. In recovering isophthalic acid by the process of the invention, the temperature is maintained below about 640° F., while in pyromellitic anhydride recovery, it is maintained below about 500° F.

The concentration in which the material to be sublimed is maintained in the media generally may be varied as desired during the operation, so long as certain critical limits are observed. The liquid should be present in sufficient quantities to completely sublime the material, or else provision should be made whereby additional liquid may be introduced to continue the sublimation process. The ratio of the liquid media to the material being sublimed on a weight basis should be at least equal to the ratio of their vapor pressures; that is, the vapor pressure of the liquid media and of the material sublimed, respectively. The amount of liquid media utilized, however, should not be so great as to involve the handling of an excessive amount in proportion to the material being sublimed. On the other hand, the concentration should be maintained sufficiently low so as to avoid any excessive flocculation and depositing of the suspensiod. It has been found that concentrations of less than about 20% in the case of isophthalic acid and terephthalic acid are particularly suitable.

The sublimation process of the invention may be operated in a multiple stage system wherein the sublimate product derived from a primary stage, as described above, is re-slurrified and introduced to a sublimation chamber in a second stage operated in a similar manner. The use of several stages in connection with the sublimation process makes it possible to obtain a product having any desired degree of purity.

It is within the scope of the new and improved sublimation process of the invention to use any practical means of condensing and solidifying the vapor products to a slurry and separating the sublimed material therefrom that is known to the art. Surface condensers or jet condensers may be used. In the surface condenser, wherein the cooling phase is kept separate from the condensing and solidifying vapors, it is desirable that a large space be utilized in order to slow down the velocity of the vapors and effect more thorough condensation and solidification. Surface condensers may also be equipped with auxiliary scraping means whereby any solidified material adhering to the condenser walls may be removed at intervals during the operation. In the use of jet condensers it is desirable that a spray of material immiscible to both the solid sublimate and liquid medium condensate be utilized to facilitate separation of the sublimate and recovery of the liquid medium for reuse.

The reduced pressure of operation may be maintained and exhaust gases evacuated by pumps or other means which are known to the art. For example, in the case of jet condensers, a barometric condenser may be utilized in which no pump is necessary.

The solid sublimate may be separated from the liquid medium condensate either by filtration or by sedimentation methods. The filtration may be performed with filter presses of the plate and frame type, continuous rotary filters, bag filters, centrifugal filters, etc. In the sedimentation processes of separation, the sublimate if heavier than the liquid medium, may be allowed to settle and the liquid decanted. If the solid sublimate is lighter than the liquid, it may be allowed to rise to the top of the liquid and skimmed or floated off. These general methods of separating the sublimed material from the slurry products are illustrative of only a few of the methods known to the art which may be used in connection with the process of the invention.

The following specific examples of the process of the invention serve to further illustrate the operation on a laboratory scale. However, these examples should not be construed as limiting the invention to the precise details set forth.

*Example I.—Recovery of terephthalic acid*

Crude terephthalic acid containing about 10% paratoluic acid as one of the impurties, and having an acid number of 607, was mixed with mineral hydrocarbon oil to form a slurry suspension containing about 5% by weight of the impure terephthalic acid mixture. The mineral hydrocarbon oil component consisted of a blend of about 20% by weight of a solvent-refined California waxy base oil having a boiling range of from about 220 to 370° F. at 1 mm. with about 79% by weight of a solvent-refined Pennsylvania base oil boiling from about 300 to 440° F. at 1 mm. The slurry was placed in a glass still provided with an overhead condenser and means for applying a vacuum. A glass gate valve was installed in the overhead system to provide means for taking cuts of the products sublimed and vaporized. The pressure in the apparatus was evacuated down to 20 mm. and heat was applied to the pot. During the preparation temperatures taken from the distillation pot were found to be more accurate than the vapor temperatures and were used to identify the cuts taken during the sublimation operation. In this example, four cuts in all were taken. Cut No. 1 taken between the temperatures of about 416 and 500° F. contained about 19.5% of the mineral hydrocarbon oil charged with about 1.7% of its weight being solid sublimate contained as a slurry. The solid material contained in this cut was found to represent about 6.4% of the total solids charged. Cut No. 1 also contained about 4.7% of the total solids in a soluble form. The insoluble solid material possessed an acid number of about 506 deviating considerably from the theoretical acid number of 674 for terephthalic acid. Cut No. 2 was taken between the temperatures of about 500 to 550° F. and consisted of about 20.9% of the oil charged containing about 3.4% of its weight in sublimed solids in the form of a slurry. These solids represented about 14.0% by weight of the crude mixture and possessed an acid number of 673 corresponding favorably to the theoretical acid number of 674 for terephthalic acid. Cut No. 3 was taken between the temperatures of about 550 and 600° F. and consisted of about 36.1% of the oil containing solids equivalent to about 6.4% of its weight in the form of a slurry. These solids represented about 46.8% of the crude solid mixture charged and had an acid number of 674, the same as the theoretical acid number of 674 for terephthalic acid. Cut No. 4 taken between the temperatures of about 600 to 750° F. contained about 19.7% of the oil and carried about 3.8% of its weight in solids as a slurry. These solids represented about 14.8% by weight of the crude mixture charged and possessed an acid number of about 671 corresponding fairly closely to the theoretical for terephthalic acid of 674. The total of cuts 2, 3 and 4 amounted to 75.6% by weight of the solid mixture charged and constituted terephthalic acid of a high degree of purity. Since the original charge contained no more than 90% by weight of the terephthalic acid, the 75.6% by weight of terephthalic acid recovered from the crude reaction mixture when corrected to a 100% basis represented an actual recovery of at least 84% by weight.

*Example II.—Recovery of pyromellitic anhydride*

A crude mixture of pyromellitic anhydride as it comes from the hay-barn condensers of a pyromellitic anhydride unit was mixed with mineral hydrocarbon oil to form a slurry having about 5% by weight of the crude pyromellitic anhydride suspended therein. The pyromellitic anhydride unit in this case utilized the process of oxidizing durene to produce pyromellitic anhydride. The crude product obtained therefrom included such impurities as aldehydes, aldehyde condensation products, partial oxidation products, and heavy bottoms such as tars and polymers. It had an acid number of 991. The mineral hydrocarbon oil blend was obtained by mixing 53% by weight of a white oil (exhaustively acid-treated solvent-refined California waxy base oil) of about 540 to 710° F. boiling range with about 47% by weight of a similar type white oil distilling about 50% in the range from about 550 to 700° F. This slurry was charged to a still as described in Example I. The pressure in the still was reduced to 20 mm. and heat was applied. As in Example I the still pot temperatures were utilized in taking cuts of the vapor products. In all, four cuts were taken and a bottoms cut remained. Cut No. 1 was taken between temperatures of about 394 to 425° F. and consisted of about 17.2% of the mineral hydrocarbon oil with about 1.2% by weight of solid sublimate equivalent to 4.2% by weight of the crude solid mixture charged. The solids were characterized by an acid number of 723 and a melting point of about 404° F. which deviated considerably from the theoretical acid number and melting point of pyromellitic anhydride which are 1028 and 507° F., respectively. Cut No. 2 was taken between the temperatures of 425 to 450° F. and consisted of about 12.5% of the mineral hydrocarbon oil containing 0.5% solid as a slurry. This solid material represented about 1.2% of the mixture charged and had an acid number of 930 and melting point of 419° F. compared to the theoretical for pyromellitic anhydride of 1028 and 507° F., respectively. Cut No. 3 taken between the temperatures of from about 450 to 550° F. consisted of about 55.0% of the oil charged and had 4.8% solids suspended as a slurry. This solid content of the slurry represented about 52.8% by weight of the crude pyromellitic anhydride charged and had an acid number of 1035 and a melting point of around 543° F. which compared favorably with the theoretical values for pyromellitic anhydride mentioned previously. Cut No. 4 taken between the temperatures of about 550 and 700° F. consisted of about 14.1% of the hydrocarbon mineral oil charged containing 5.4% solids as a slurry which solids represented about 15.2% by weight of the crude pyromellitic anhydride charged. These solids possessed an acid number of 1018 and a melting point of 540° F. and also corresponded favorably with the theoretical for pure pyromellitic anhydride. The bottoms remaining in the still after the above cuts had exhausted the mineral hydrocarbon oil medium represented about 10.0% of the original crude pyromellitic anhydride charged and were not capable of analysis due to color bodies and other impurities present. Cuts 3 and 4 were taken as pyromellitic anhydride of a high degree of purity. The combined yields of cuts 3 and 4 amounted to a total recovery of about 68% substantially pure pyromellitic anhydride by weight of the crude mixture charged.

*Example III.—Separation of terephthalic acid and isophthalic mixtures*

A mixture consisting of about 60% terephthalic acid and 40% by weight of isophthalic acid was suspended in a hydrocarbon mineral oil to form a slurry containing about 7.7% by weight of the acid mixture. The hydrocarbon mineral oil was a blend of about 33.3% each of solvent refined California waxy crude base oils having boiling ranges of about 220 to 370° F. and 300 to 440° F., respectively, at 1 mm. The remaining 33.4% of the hydrocarbon mineral oil blend was a Pennsylvania solvent refined mineral oil boiling in the range of about 320 to 540° F. at 1 mm. The mixture was charged to a still which in this instance proved to be inadequately insulated around the overhead lines, thereby necessitating a purging from the lines of solidified sublimate whenever a cut was taken. The material recovered by the purging of the overhead lines was analyzed separately for each cut and was found to agree fairly closely with the analysis of the cut itself. The analysis of the mixtures of iso- and terephthalic acids was based on a mixed melting point curve which had been prepared previously from pure samples of tere- and isophthalic acid. The ratio of terephthalic acid to isophthalic acid was denoted as TPA/IPA. Cut No. 1 taken between the temperatures of about 415 and 500° F. consisted of about 36.5% of the hydrocarbon mineral oil charged and contained about 4.0% suspended solids. These solids combined with the material purged from the overhead lines consisted of about 22.4% of the TPA-IPA mixture charged. This product was determined to have a TPA/IPA ratio of about 18/82 from the mixed melting point curve. Cut No. 2 was taken between the temperatures of about 500 to 525° F. and consisted of about 21.6% of the mineral hydrocarbon oil charged containing a slurry of solids present in about 5.4% by weight which was equivalent to 14.8% of the mixture charged. These solids combined with those purged from the overhead lines amounted to about 20.0% by weight of the charge and possessed a TPA/IPA ratio of about 50/50. Cut No. 3 taken between the temperatures of about 525 to 555° F. contained 14.5% of the mineral oil charged with solids present in an amount of about 4.8%. These solids were combined with those purged from the overhead, amounted to about 11.6% by weight of the mixture charged, and were found to possess a TPA/IPA ratio of about 95/5. Cut No. 4 was taken between the temperatures of about 555 to 576° F. and contained about 1.7% of the mineral oil charged with no solids present. Cut No. 5 taken between the temperatures of about 576 to 650° F. contained about 21.4% of the mineral oil charged with about 8.8% of solids suspended as a slurry. These solids combined with the overhead solids purged for cut No. 4 and those for cut No. 5 amounted to about 36.8% of the mixture charged and gave an average TPA/IPA ratio of about 95/5.

In this example the low-vapor pressure solid, terephthalic acid, was present in a major proportion of the TPA/IPA mixture charged, that is, 60%. Although in the first cut the high-vapor-pressure solid, insophthalic acid, predominated in the amount of 82%, it can be seen from the analysis of the cuts following that the isophthalic acid was being exhausted from the mixture charged and the solid subliming was approaching pure terephthalic acid as shown by an analysis of the cuts becoming 95% terephthalic acid.

In view of the foregoing illustrations and specific embodiments of preferred process conditions for my invention, various modifications utilizing the principles of my invention will be apparent to one skilled in the art. My invention contemplates all such variations and modifications as come within the scope of the appended claims.

I claim:

1. An improved sublimation process for separating benzene polycarboxylic acids in substantially pure form from solid mixtures containing them, which comprises suspending the solid mixture in a hydrocarbon oil which boils substantially in the range of from about 400 to about 750° F., heating the suspension in an evaporating zone to a temperature between about 415° F. and about 750° F. which is below the melting point of the solid mixture, maintaining a reduced pressure in the evaporating zone and withdrawing a vapor phase comprising vaporized hydrocarbon oil and the sublimed benzene polycarboxylic acids from said evaporating zone.

2. An improved sublimation process for separating benzene polycarboxylic acids in substantially pure form from solid mixtures containing them, which comprises suspending the solid mixture in finely divided form in a hydrocarbon oil which boils substantially in the range from about 400 to about 750° F., which has no appreciable capacity to dissolve the solid mixture and which is chemically inert toward the solid, heating the suspension in an evaporating zone to a temperature between about 415° F. and about 750° F. which is below the melting point of the solid mixture, maintaining a reduced pressure in the range of from about 20 to about 200 mm. Hg in the evaporating zone and withdrawing a vapor phase comprising vaporized hydrocarbon oil and sublimed benzene polycarboxylic acid from said evaporating zone.

3. An improved sublimation process for separating terephthalic acid in substantially pure form from solid mixtures containing it, which comprises suspending no more than 20% by weight of the solid mixture in a hydrocarbon oil which boils substantially in the range of from about 400 to about 750° F., heating the suspension in an evaporating zone to a temperature between about 415° F. and about 750° F. which is below the melting point of the solid mixture, maintaining a pressure of about 20 mm. Hg in the evaporating zone and withdrawing a vapor phase comprising vaporized hydrocarbon oil and sublimed terephathalic acid from said evaporating zone.

4. An improved sublimitation process for separating pyromellitic anhydride in substantially pure form from solid mixtures containing it, which comprises suspending no more than 20% by weight of the solid mixture in a hydrocarbon oil which boils substantially in the range of from about 400 to about 750° F., heating the suspension in an evaporating zone to a temperature between about 450° F. and about 700° F. which is below the melting point of the solid mixture, maintaining a pressure of about 20 mm. Hg in the evaporating zone and withdrawing a vapor phase comprising vaporized hydrocarbon oil and sublimed pyromellitic anhydride from said evaporating zone.

5. An improved sublimation process for separating isophthalic acid in substantially pure form from solid mixtures containing it, which comprises suspending no more than 20% by weight of the solid mixture in a hydrocarbon oil which boils substantially in the range of from about 400 to about 750° F., heating the suspension in an evaporating zone to a temperature between about 415° F. and about 640° F. which is below the melting point of the solid mixture, maintaining a pressure of about 20 mm. Hg in the evaporating zone and withdrawing a vapor phase comprising vaporized hydrocarbon oil and sublimed isophthalic acid from said evaporating zone.

6. The method of purifying crude terephthalic acid, which comprises suspending the crude acid in finely divided form in a hydrocarbon oil which boils substantially in the range of from about 400 to about 750° F., heating the suspension in an evaporating zone to a temperature below the melting point of the crude acid and in the range from about 415 to about 750° F., maintaining a subatmospheric pressure in the evaporating zone and withdrawing a vapor phase comprising vaporized oil and sublimed terephthalic acid from said evaporating zone.

WILLIAM G. TOLAND, Jr.

REFERENCES CITED

The following references are of record in the file of this patent:

UNITED STATES PATENTS

| Number | Name | Date |
|---|---|---|
| 1,694,124 | Jaeger | Dec. 4, 1928 |

OTHER REFERENCES

Morton: "Lab. Technique in Org. Chem." (McGraw-Hill), page 99 (1938).